March 15, 1966 R. H. SCHUMAN 3,241,121
MEMORY DEVICE
Filed Sept. 16, 1960
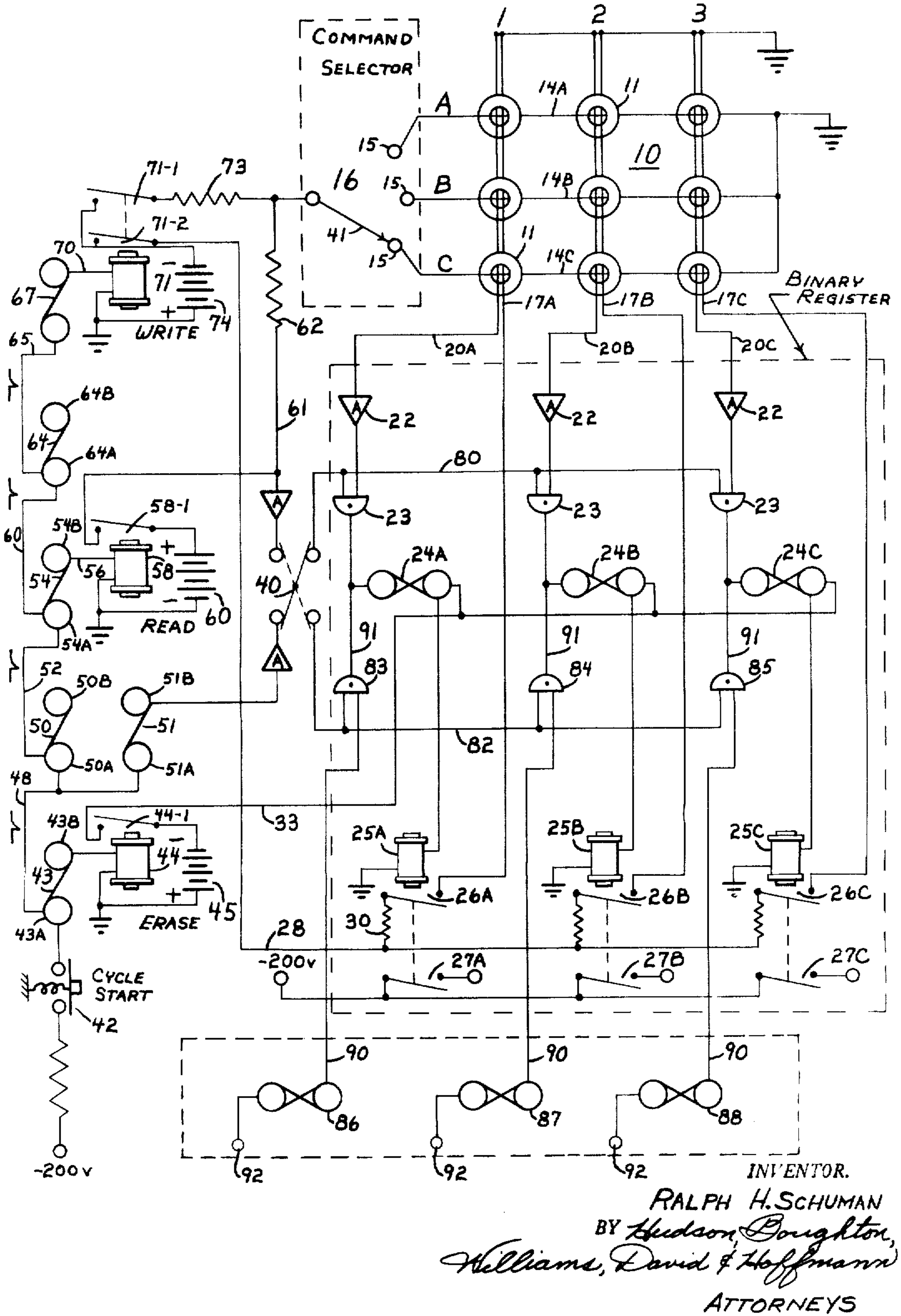
INVENTOR.
RALPH H. SCHUMAN
BY Hudson, Boughton, Williams, David & Hoffmann
ATTORNEYS United States Patent Office 3,241,121

Patented Mar. 15, 1966

3,241,121
MEMORY DEVICE

Ralph H. Schuman, Cleveland, Ohio, assignor to The Warner & Swasey Company, Cleveland, Ohio, a corporation of Ohio Filed Sept. 16, 1960, Ser. No. 56,601
8 Claims. (Cl. 340—172.5)

The present invention relates to the type of data storage systems wherein a plurality of storage elements, preferably magnetic cores, are settable to a first condition, arbitrarily designated as a 1 condition, by applying a signal thereto having the proper magnitude and sense and are resettable to a second condition which may be arbitrarily defined as a 0 condition by applying thereto a signal having a predetermined magnitude and opposite sense to the first-mentioned signal. In certain storage elements of this type, the element has an output connection upon which a read-out signal appears when the storage element changes from one particular state to its other state and, generally, a read-out signal conventionally occurs when the element changes from its 1 state to its 0 state to indicate that a 1 had been set in the storage element. In this type of system, the read-out is destructive in that the setting in the storage element must be destroyed to effect a reading of the core, since it is the transition of the element which provides the read-out signal when a 1 is set therein. In many applications, it is desirable that the information stored in the element not be destroyed but be maintained for subsequent use and, accordingly, various systems have been devised for restoring the storage element to its 1 condition after read-out provided the element was set in its 1 condition before read-out.

In the type of storage system to which the present invention relates, the storage element is set to its 1 condition by applying two signals to two different input connections to the storage element, with neither signal being capable of effecting a setting of the element by itself but with the combined signals having the necessary magnitude and sense to effect a setting of the element. The information is read out by applying a signal to the first input connection, which signal is of a magnitude and sense sufficient to reset the storage element to its 0 condition, if set in its 1 condition, thereby to provide a read-out signal on the output connection provided the storage element was set in its 1 condition. Consequently, it can be seen that a storage element can be set in its 1 condition by applying a write signal to the element in the form of component ½ write signals which are applied simultaneously to the two input connections, neither one being capable in itself of effecting a setting of the element but the combined signals effecting a setting of the storage element to its 1 state. The storage element can then be read out by applying a single read-out signal to one of the connections or a ½ read-out signal to each of the connections and if the element is in a 0 state, no output signal will appear, but if in a 1 state, an output signal will appear.

In storage systems, the storage elements which are to be read simultaneously have their first input connections connected to a common line so that when a ½ write signal is applied to the common line, the signal is applied to all of the first connections of the storage elements. The storage elements, however, are not set to their 1 condition unless a ½ write signal is also applied to the second input connections to the elements, each of the elements having an individual second input connection which has a ½ write signal applied thereto when the storage element is to be set.

An important object of the present invention is to provide a new and improved data storage system wherein the information is destroyed during read-out and wherein a read-out register set during read-out also conditions circuits for restoring the information destroyed by read-out.

It is also an object of the present invention to provide a data storage system wherein a read-out register is also utilized to effect the writing of information into the data storage system.

Yet another object of the present invention is to provide a new and improved data storage system comprised of a plurality of storage elements whose setting is normally destroyed during read-out wherein a sequence of signals are generated and wherein the same sequence of signals is utilized to effect both read-in and read-out of information with the latter being accomplished in a non-destructive manner.

In accordance with the present invention, a register comprising binary read-out elements for each storage element of a group being read is provided and output signals from the data storage system signalling the reading of a 1 energize or set the respective binary read-out elements or storage devices of a register to a 1 state indicating that a 1 had been stored in the system and the elements may be used to effect the control of various circuits in accordance therewith. The respective binary read-out elements also, when set to a 1 state, close circuits for applying a ½ write signal to the individual input connection of the corresponding storage element so that a write signal can be applied thereto to set the storage element in a 1 state, i.e. to its condition corresponding to that necessary to effect the actuation of the binary read-out element.

In the preferred and illustrated embodiment, the output signal indicating the storage of a 1 energizes a relay and the relay closes a contact so that a ½ write pulse which appears in time after a read-out pulse is applied to one input connection for the corresponding storage element simultaneously with a ½ write pulse applied to another input connection to effect a setting of the core.

Further objects and advantages of the present invention will be apparent from the following detailed description thereof made with reference to the accompanying drawing forming a part of the present specification and in which the sole figure is an electrical circuit diagram of a data storage system embodying the present invention.

Referring to the drawings, a data storage matrix is shown as comprising a plurality of storage elements 11 with each of the elements being shown as a bistable magnetic core. The magnetic cores are of a well known type and are capable of assuming two states of magnetization, which states, for the sake of convenience, shall be designated as their 0 and 1 states, respectively. Normally the cores are considered as being in their 0 states and are set in their 1 states to store a 1 bit therein by subjecting the core to the magnetic influence of an electrical signal of one sense and magnitude and are resettable to their 0 state by subjecting the core to the magnetic influence of an electrical signal of opposite sense.

The data storage system 10 is shown as comprising rows of magnetic cores 11, with the rows being designated as rows A, B, C, with the magnetic cores of the rows being arranged in columns 1, 2, 3. The magnetic cores of each row are those cores which are to be read simultaneously, with one row of the storage system to be read at any one time. Specific cores shall hereinafter be designated by the reference numeral 11 with an appendix consisting of the row letter and column number. Thus, the top left-hand core in the drawing would be designated as 11–A1. The magnetic cores 11 of each row have a common input connection which is used as a ½ write connection and a read signal connection, with the connections being designated by the reference characters 14A, 14B, 14C. Each connection 14A, 14B, 14C extends through each of the cores of the corresponding row and is connected to a respective contact 15 of a command selector 16 shown as a switch having a switch arm 41 for selecting a particular row. The cores of each column also have a common input write connection which is used as a ½ write connection, with the common connections for each column being designated by the reference characters 17A, 17B, 17C. If information or data is to be written in one of the rows of the storage, a ½ write signal is applied to the common write connection for that row and a corresponding ½ write signal is applied to the ones of column write connections 17A, 17B, or 17C which are associated with the cores that are to be set to a 1 condition. The magnitude of each ½ write signal applied to each of the write connections is not of itself sufficient to effect a setting of the core, but when a signal is present on each of the column and row connections for the particular core, the core is set to its 1 condition. The method of setting the cores will be described in more detail hereinafter.

Each of the cores in each of the columns 1, 2, 3 is provided with an output connection common to the other cores of the column, with the column output connections being designated by the reference characters 20A, 20B, 20C and corresponding to columns 1, 2, 3, respectively. When the information stored in the cores of any given row is to be read, a read signal is applied to the connection common to all the cores of that row. For example, if the cores of row C are to be read, a read signal of full magnitude and of a sense opposite to the sense of the write signal is applied to the connection 14C and if any of the cores in row C have been previously set to a 1 condition, the cores will change to their 0 condition and this transition will effect an output signal on the corresponding read-out connection for the column of the core. It will be apparent that the read signal destroys the setting of the storage elements and restores all elements to their 0 condition and, therefore this type of read-out is termed "destructive" read-out.

In the circuit of FIG. 1, the read-out signal on each column output connection is applied through a transfer connecting means comprising an amplifier 22 and an AND gate 23 to a storage device in the form of a bistable multivibrator circuit, with the bistable multivibrator circuits corresponding to the columns 1, 2, 3 being designated by the reference characters 24A, 24B, 24C, respectively. The bistable multivibrator circuits 24A, 24B, 24C function as storage devices and switches and have a normal or 0 state wherein the left-hand side thereof, as viewed in the drawing, is conductive and the application of a read-out signal to the left-hand side thereof sets the multivibrator in its other, or 1, state to indicate that a 1 had been stored in the core of the column which is being read. The bistable multivibrator elements each control a corresponding read-out storage device in the form of relays 25A, 25B, 25C and when the multivibrator is in its 0 state, the corresponding relay is de-energized, but when it is set to its 1 state, the corresponding relay is energized, closing contacts associated with each relay. The relay 25A has associated therewith normally open contacts 26A, 27A, and the relays 25B, 25C have corresponding contacts 26B, 27B and 26C, 27C, respectively. The contacts 27A, 27B, 27C are normally open contacts which are closed when the corresponding relay is energized and which may be utilized to control various corresponding control circuits which are broken and made when the corresponding one of the contacts 27A, 27B, 27C is opened and closed.

The contacts 26A, 26B, 26C are operable to connect the write connections of the cores in the columns 1, 2, 3, respectively, to a common ½ write, column conductor 28, with each of the contacts 26A, 26B, 26C effecting the connection of the corresponding ½ write connection

17A, 17B, 17C to the conductor 28 through an individual resistor 30. The contacts 26A, 26B, 26C, therefore, determine when a write signal can be applied to the corresponding column write connection 17A, 17B, 17C and this can only be done when the corresponding contacts of the relays 25A, 25B, 25C are closed.

As pointed out above, the relays 25A, 25B, 25C are energized when the core in the column corresponding to the relay and in the row to which the read signal is applied changes from a 1 state to a 0 state to provide an output signal on the corresponding one of the column read-out connections 20A, 20B, 20C to indicate that the core had been in its 1 state. If the information is to be restored in the core after read-out, it is necessary to again return the core to its 1 state and this is done in the illustrated embodiment by applying a ½ write pulse to the corresponding one of the row input connections 14A, 14B, 14C and to the common column write conductor 28. If the core had a 1 stored before read-out, the corresponding relay, 25A, 25B, 25C is energized and the corresponding one of the contacts 26A, 26B, 26C is closed so that the ½ write pulse applied to the conductor 28 is applied through the closed contacts to the corresponding one of the column write connections 17A, 17B, 17C and the core which had been in a 1 state will be returned to the 1 state by the combination of the ½ write signal applied to the row input connection and to the column input connection. If a 0 had been stored in a core before read-out, the corresponding one of the contacts 26A, 26B, 26C is opened when the ½ write signal is applied to conductor 28 and the ½ write signal applied to the row connection is insufficient by itself to effect a switching of that particular core.

After the cores in a particular row which had been set to a 1 before read-out are restored to a 1 condition, the data in the storage is the same as before read-out.

It is necessary to clear the relays 25A, 25B, 25C before each read-out and to this end, an erase connection 33 is provided. The erase connection is connected to each of the bistable multivibrator circuits 24A, 24B, 24C and when an erase signal is applied thereto, the circuits are reset to their 0 state where the corresponding relays 25A, 25B, 25C are de-energized.

It can now be seen that, if data has been stored in the data storage 10 and it is desired to read the data stored in a particular row, this may be accomplished by applying a read signal to the row input connection for the cores of that row to cause all cores in the row which have a 1 set therein to change from their 1 state to their 0 state. Each core which changes from its 1 state to its 0 state provides an output signal on the corresponding column read-out connection 20A, 20B or 20C, as the case may be, and the signal on the read-out connection sets a bistable multivibrator to a state where a corresponding relay for each column is energized if the multivibrator is set to its 1 state. The relays or binary elements 25A, 25B, 25C indicate whether a 1 or a 0 is set in the corresponding core being read and if a 1 had been set therein and the relay energized, the corresponding one of contacts 26A, 26B or 26C is closed to connect the column input connection for the particular core to the common conductor 28. The cores in the row just read which had a 1 therein are then restored to their 1 condition by simultaneously applying a ½ write connection to both the row input connection and the column input connection. Those cores which did not have a 1 therein will not be affected by the ½ write signals since the contacts to the column connection controlled by the corresponding read-out relays will be open to break the connection of the column connection to the wire 28.

Immediately prior to the next read-out, the connection 33 has an erase signal applied thereto which resets the ones of the bistable multivibrators 24A, 24B, 24C which had been set to their 1 state to their 0 state to de-energize the corresponding read-out relays and the read and write pulses are then applied in sequence to effect the next read-out.

It can be seen that data may be set in any row of the storage by setting the bistable multivibrator elements 24A, 24B, 24C which correspond to the cores of the row that are to have a 1 set therein. This will cause energization of the read-out relays 25A, 25B, 25C if a 1 is to be set in the corresponding core of the row. Then by applying a ½ write pulse to the row input connection and a ½ write pulse to the common column conductor 28, the cores of the row which are to be set to a 1 will have ½ write pulses applied thereto through both the row input connection and the corresponding column connection, since the corresponding ones of the contacts 26A, 26B, 26C will be closed. Prior to the reading-in of the information, the previous information stored in the data storage 10 can be destroyed and the multivibrators 24A, 24B, 24C restored to their 0 state by applying an erase signal to connection 33 to reset the multivibrators 24A, 24B, 24C and by applying a read-out pulse to the row of cores without conditioning gates 23 to pass any read-out signals which occur.

In the illustrated embodiment, circuitry is shown for applying read, write and erase signals to the row input connections, the erase connection 33 and the column connection 28. The circuitry includes a selector switch 40 which is operable between two positions to condition the circuit for read-out and read-in, respectively. When the switch 40 is as shown in the drawing in full lines, the circuit is conditioned for read-out. To read out information stored in a particular row, a wiper arm 41 of the switch 16 is moved to select the particular row of cores to be read and in the drawing, the row C has been shown as selected. To initiate the read-out operation, a cycle start button 42 is momentary depressed and this connects the normally conductive stage of a monostable multivibrator 43 to a negative potential which may be of the order of magnitude of −200 volts to cut off the conductive stage or stable state of the multivibrator and trigger the circuit to render the nonconductive stage conductive. The monostable multivibrator is shown schematically since such circuits are well known to those skilled in the art and the manner of using such circuits to control the energization of circuit elements, such as relays, and to provide pulses upon transition between states are well known and need not be described in detail. The stage of the multivibrator circuit which is conductive when the circuit is in its stable state is termed the "normally conductive" stage of the multivibrator 43 and is designated by the reference numeral 43A and the normally nonconductive stage representing the nonstable stage when conductive is designated by the reference numeral 43B. When the stage 43B conducts, a relay 44 controlled by the multivibrator 43 is energized to close contacts 44–1 of the relay to effect the connecting of the erase connection 33 to a power supply which is illustrated for the purposes of simplicity and clarity as a battery 45. When the contacts 44–1 are closed, a negative potential is applied to the erase connection 33 which effects a resetting of the binary elements 24A, 24B, 24C to their 0 state, if not already in the 0 state.

The multivibrator 43 also has an output connection 48 upon which a pulse occurs when the multivibrator switches from its nonstable to its stable state. Preferably, the output pulse is a negative pulse as indicated on the drawing.

The pulse appearing on the connection 48 is applied to the normally conducting stages of monostable multivibrator circuits 50, 51, respectively. The monostable multivibrator circuits 50, 51 have stable stages which are normally conductive and which are indicated by the reference characters 50A, 51A, respectively, and nonstable normally nonconductive stages designated by the reference characters 50B, 51B, respectively.

The monostable multivibrator circuit 50 has an output connection 52 upon which a negative pulse appears when the multivibrator circuit switches from its nonstable state to its stable state. The connection 52 is connected to a monostable multivibrator circuit 54 having a stage 54A which is normally conductive when the multivibrator 54 is in its stable state and a stage 54B which is normally nonconductive when the multivibrator is in its stable state and conductive when in its nonstable state. The multivibrator 54 has an output connection 56 which controls the energization of a relay 58 and the relay 58 is energized as long as the multivibrator is in its nonstable state and is de-energized when the multivibrator is in its stable state. The monostable multivibrator 54 also has an output connection 60 upon which a negative pulse appears when the multivibrator switches from its nonstable to its stable state.

The energization of the relay 58 when the multivibrator 54 is in its nonstable state closes normally open contacts 58–1 of the relay 58 to complete a circuit for connecting a source of potential, which is indicated for the sake of simplicity and clarity as a battery 60, to the wiper 41 of the switch 16 through a connection 61 which includes a resistor 62. The closing of the contacts 58–1 connects the input connection 14C for the row C to the source of potential 60 to apply a read signal to the row input connection 14C. The signal in the illustrated and preferred embodiment is a positive potential having a magnitude capable of switching the cores from their 1 state to their 0 state.

After the read signal has been applied to the row connection 14C, a ½ write signal is to be applied to the connection 14C and to the ½ write connection 28. To effect this, the output connection 60 of the multivibrator 54 upon which a negative pulse appears is connected to a delay monostable multivibrator 64 having a stage 64A which is normally conducting when the multivibrator is in its stable state and a stage 64B which is conducting when the multivibrator is in its nonstable state. The multivibrator 64 has an output connection 65 upon which a negative pulse appears when the multivibrator switches from its nonstable state to its stable state. The output connection 65 is connected to a monostable multivibrator 67 to effect a triggering of the multivibrator 67 from its stable state to its unstable state. The multivibrator 67 has an output connection 70 which controls the energization of a relay 71. When the multivibrator 67 is in its stable state, the relay 71 is de-energized and is energized when the multivibrator 67 is in its nonstable state.

The relay 71 has two pairs of normally open contacts 71–1, 71–2. When the contacts 71–1 are closed upon the energization of relay 71, the switch arm 41 is connected through a resistor 73 and the contacts 71–1 to the negative side of a source of potential 74, indicated for the sake of simplicity and clarity as a battery, to apply a ½ write signal to the row input connection 14C through the switch arm 41. The closing of the contacts 71–2 connects the common column ½ write conductor 28 to the source of potential 74 to apply a ½ write signal to the conductor 28 and, in turn, to the column connections 17A, 17B, 17C if the corresponding one of the relays 25A, 25B, 25C is energized.

From the foregoing description of the circuit, it can be seen that when the cycle start button is depressed to initiate a read-out cycle, the triggering of the multivibrator 43 upon the depression of the cycle start button 42 effects energization of the relay 44 to reset the bistable multivibrators 24A, 24B, 24C to their 0 states, if they are not already in their 0 states, to thereby de-energize all the relays 25A, 25B, 25C. The monostable multivibrator 43 also provides a delay pulse which triggers monostable multivibrators 50, 51 to their nonstable states after the termination of the erase signal. The monostable multivibrator 50 when returning to its stable state, provides a pulse which triggers the monostable multivibrator 54 to its nonstable state to energize the relay 58 to apply a read signal to the row being read. The read signal effects a switching of all the cores in the row that are in a 1 state to their 0 state. This switching is to set the corresponding ones of the bistable multivibrators 24A, 24B, 24C to their 1 state and to accomplish this, the gates 23 must be conditioned by a transfer signal to pass the output signal. The multivibrator 51 which is triggered simultaneously with the multivibrator 50 is connected to a gate connection 80 through the switch 40 when the latter is in its read-out position to condition the gates 23 to pass any output signal which appears on the column output connections 20A, 20B, 20C and the monostable multivibrator 51 has a relatively long delay before it returns to its stable state to allow the multivibrator 50 time to effect a triggering of the multivibrator 54 and the energization of the relay 58 to apply the read signal to the data storage 10. After the read signal has been applied to the input connection for the row being read, the bistable multivibrator circuits 24A, 24B, 24C will have been set to their 1 condition if a 1 had been set in the corresponding core of the row and, consequently, the relays 25A, 25B, 25C are energized in accordance with the information which was read out of the row. The information which had been stored in the row which was read out is restored and the restoration of the information is initiated by the pulse on the output connection 60 from the multivibrator 54. This pulse is delayed by the multivibrator 64 and then applied to the multivibrator 67 to trigger the latter to its nonstable state and to effect the energization of the relay 71 to close its contacts 71–1, 71–2 to apply ½ write signals to the switch arm 41 and to the ½ write column conductor 28. If a 1 had been set in a core of the row, the corresponding one of the relays 25A, 25B, 25C will be energized to connect the column write connection through that core to the ½ write connection 28. It will be noted that the use of a plurality of parallel resistors 30, one in each column input connection, enables a ½ write signal of a given magnitude to be derived from the common column conductor 28 by applying a write signal of a given magnitude to the conductor 28 regardless of how many of the contacts 27A, 27B, 27C are closed.

When information is to be read into the data storage system, the selector switch 40 is switched to the position shown in dotted lines in the drawing. In this position, the read signal from relay 58 is applied to a gate connection 82 which is connected to one input of each of a plurality of AND gates 83, 84, 85. When a signal is applied to the gate connection 82 upon the energization of relay 58, the gates 83, 84, 85 will pass this signal if the other inputs of the gates have controlled the gates for passage. These other inputs are connected to any switch, relay, or tube device indicating whether a signal is to be stored in the memory. A bistable multivibrator is shown as a control connected to each of the gates 83, 84, 85. These have been designated by the reference numerals 86, 87, 88. The bistable multivibrator circuits 86, 87, 88 are connected to one of the multivibrators 24A, 24B, 24C, respectively, by transfer connecting means which include an output connection 90 connected to the corresponding one of the gates 83, 84, 85 and when the bistable multivibrator circuits are set in their 1 state they control the gates so that when a signal is applied to the connection 82, an ouput signal appears on a respective output connection 91 from the controlled gates. The output connections 91 are connected to respective ones of the bistable multivibrator circuits 24A, 24B, 24C and the signal thereon is effective to set the corresponding multivibrator circuit in its 1 state. Consequently, if any one of the multivibrators 86, 87, 88 is in its 1 state, the corresponding one of the corresponding multivibrators 24A, 24B, 24C will be set in its 1 state when the signal is applied to the gating connection 82. The setting of any one of the multivibrators 24A, 24B, 24C to its 1 state effects the energization of the corresponding relays 25A, 25B, 25C to connect the corresponding one of the column connections 17A, 17B, 17C to the common column ½ write connection 28. When, therefore, the relay 71 is energized to close its contacts 71–1, 71–2 to apply ½ write signals to the switch arm 41 and to the common column input conductor 28, the cores in the row to which the switch 41 is set will be switched to their 1 state if the corresponding relays 25A, 25B, 25C have been energized. Consequently, the settings of the bistable multivibrator circuits 86, 87, 88 have been transferred to the cores of the row to which the selector switch is set. After the information for one row has been read into the row, the switch arm 41 may be moved to select another row and the cycle start button depressed to initiate a new cycle. The energization of the relay 44 to provide an erase signal on the erase connection 33 will reset the bistable multivibrator circuits 24A, 24B, 24C and the relays 25A, 25B, 25C to their 0 states preparatory to again being set in accordance with the bistable multivibrator circuits 86, 87, 88.

It will be noted that the read signal during read-in or writing, in addition to passing through gates 83, 84, 85 also is applied through the resistor 62 and the switch arm 41 to the row of cores to be set and switches all cores in the row in their 1 state to their 0 state. An output signal will appear on the corresponding column output connection for any core so switched but the gates 23 will not be conditioned to pass the output signals since the setting of switch 40 to its read-in or write position breaks the circuit between the gating multivibrator 51 and the gate control connection 80.

The read-in multivibrator circuits each have input connections 92 and when a high level voltage is applied to the connection, the circuit is reset in its 0 state and when a low level voltage is applied, the circuit is set in its 1 state. The high and low level voltages may be high and low level signals derived from a binary coded code wheel or any other electronic devices.

It can now be seen that the present invention provides a new and improved storage system wherein a read-out register is utilized to condition circuits for restoring the setting of the storage elements being read, which are of the type that would normally have the setting destroyed by the read-out operation. The data storage system is also such that the read-out register is used to write original information into the cores.

While two input connections have been utilized it will be appreciated by those skilled in the art that three or more input connections could be utilized in practicing the invention as long as the signals on the individual input connections were not in themselves capable of setting the cores.

While a preferred embodiment of the present invention has been described in detail, it is my intention to hereby cover all modifications, constructions, and arrangements which fall within the ability of those skilled in the art and within the scope and spirit of the present invention.

Having described my invention, what I claim is:

1. In an information storage system comprising a row of storage elements each having input means comprising a plurality of input connections, said elements each having a 0 state and a 1 state and being set to the 1 state by the application of a plurality of input signals to respective ones of said input connections for the element which input signals combine to provide a resultant signal having a first predetermined magnitude of a first polarity and reset to the 0 state by the application of an electrical read signal to one of said input connections for the element, said electrical read signal having a second predetermined magnitude of a second polarity opposite to said first polarity, a plurality of read-out connections each connected to a respective one of said storage elements and on which a read-out signal is produced when the element is reset from its 1 to its 0 state, a register including a plurality of binary read-out devices connected to respective ones of said read-out connections and settable to a first condition in response to a read-out signal on the corresponding read-out connection and to a second condition in response to a reset signal, said binary read-out devices corresponding to a respective one of said storage elements, reset connections to each of said read-out devices, individual contacts controlled by each of said binary read-out devices of said register and responsive to the binary read-out device to make or break the connection of one of said plurality of input connections to the storage element corresponding to the binary read-out device and enabling or disabling the said one input connection controlled by the binary read-out device to transmit an input signal, means for providing and applying in sequence: (1) said reset signal to said reset connections for said binary read-out devices, (2) said read signal of said second predetermined magnitude and said second polarity to said one of said input connections for each element, and said plurality of signals simultaneously to said input connections for each element with said plurality of signals having combined magnitudes at least as great as said first predetermined magnitude and of said first polarity with the individual magnitudes of said plurality of signals being less than said first predetermined magnitude.

2. In a data storage system, a storage element having first and second states designated by 0 and 1 and settable to its 1 state and resettable to its 0 state by the application thereto of write and read electrical signals respectively, said element having a read-out connection on which an output signal appears upon the transition of the element from its 1 state to its 0 state, a read-out device having first and second stable states corresponding to said 0 and 1 states of said element and settable to said second state in response to said output signal and including reset connections responsive to a reset signal to reset said device to its first state, first transfer means connecting said read-out connection to said read-out device and including means responsive to a transfer signal to render said transfer means effective, a read-in storage device settable in either one of first and second stable states, a second transfer connection between said read-in storage device and said read-out storage device for setting the latter in its said second state independently of said storage element when said read-in device is in a particular one of its said states, control means for rendering said second transfer connection effective in response to a transfer signal, circuit means for applying a read signal to said storage element to reset said storage element to its 0 state, and circuit means selectively operable to apply a reset signal to said read-out device prior to said read signal and a transfer signal to said first transfer connection simultaneously with said read signal or to apply said read signal to said second transfer connection as well as to said storage element, and means for applying a write signal to said storage element to set the latter to its 1 state comprising contacts controlled by said read-out device and actuated to a condition rendering the circuit means capable of effecting setting of said storage element when said read-out storage device is in its said second state.

3. In a data storage system, a magnetic core settable from a first state of magnetization to a second state by the application of a write signal and resettable to its said first state by the application of a read signal, said core having an output connection upon which a read-out signal appears upon transition of the core from its said second state to its said first state, a read-out storage device settable from a first state to a second state in response to said read-out signal and resettable to its first state in response to an erase signal, first transfer means connecting said output connection to said read-out device and including means for selectively rendering said read-out device nonresponsive to said read-out signal, circuit means for selectively applying an erase signal to selectively set said read-out storage device to its first state and for applying a read signal to said core, said circuit means including further circuit means for applying a write signal to said core to set said core to its said second state comprising switching means operated by said read-out device to respectively enable or disable said further circuit means when said read-out device is in a respective one of its states in response to said read-out and erase signals, means for generating said erase, read and write signals in sequence, a read-in storage device having first and second conditions corresponding to said first and second states of said core and selectively settable in either one of its said first and second conditions, second transfer means connecting said read-in storage device to said read-out storage device including means for selectively rendering said second transfer means effective to set said read-out storage device in its said second state when said read-in storage device is in its said second state, and control means for selectively rendering said first transfer means nonresponsive to said read-out signal and for rendering said second transfer means effective intermediate said erase and write signals to set said read-out storage device according to said read-in storage device.

4. In a data storage system, a plurality of magnetic cores arranged in a matrix comprised of a plurality of rows and columns extending transversely of each other, each of said magnetic cores being settable from a first state of magnetization to a second state by the application of a write current signal and resettable to its said first state by the application of a read signal, and each column of cores including an output connection upon which a read-out signal appears upon the transition of any core in the column from its second state to its first state, a read-out storage device corresponding to each column of cores and settable from a first to a second state in response to said read-out signal and resettable to its first state in response to an erase signal, circuit means for selectively applying an erase signal to each of said read-out devices and for applying read signals to said cores, a write current signal generator for generating a write current signal each time a read signal is applied to one of said cores, current conducting connections connecting said signal generator to each column of cores to apply a write current signal produced by said signal generator to the column of cores and switching means in each of said conducting connections for respectively connecting and disconnecting said generator from each of said columns of cores when the read-out storage device for the column is respectively switched between its states to thereby enable or disenable the corresponding conducting connection to transmit the write current signal on the switching of the read-out storage device to a respective one of its states.

5. In a data storage system as defined in claim 4 wherein said current conducting connections comprise a connection for each column of cores which is connected to a common conductor by said switching means through indvidual resistances.

6. In a data storage system, a magnetic core settable from a first state of magnetization to a second state by the application of a predetermined write current signal thereto and resettable to its said first state by the application of a reset signal, said core having an output connection upon which a read-out signal appears upon the transition of said core from its second state to its first state, a read-out storage device settable from a first to a second state in response to said read-out signal, a write current signal generator for generating a write current signal each time a reset signal is applied to said core, a connection connecting said signal generator to said core to apply the write current signal from said signal generator to said core, and switching means in said connection to connect and disconnect said generator from said core and when said read-out storage device is switched between its states to enable or disenable said connection when said read-out storage device is in a respective one of its states.

7. In a data storage system, a magnetic core settable from a first state of magnetization to a second state by the application of a write current signal thereto and resettable to its said first state by the application of a reset signal, said core having an output connection upon which a read-out signal appears upon the transition of said core from its second state to its first state, a read-out storage device settable from a first to a second state in response to said read-out signal, a write current signal generator for generating a write signal each time a reset signal is applied to said core, a connection connecting said signal generator to said core to apply the write current signal from said signal generator to said core, and switching means in said connection to connect and disconnect the signal from said generator from said core when said read-out storage device is switched between its states to enable or disable said connection when said read-out storage device is in a respective one of its states, erase means for resetting said read-out storage device to its first state, and read-in means for setting said storage device to its second state independently of said read-out signal.

8. In a data storage system, a magnetic core settable from a first state of magnetization to a second state by the application of a write current signal thereto and resettable to its said first state by the application of a reset signal, said core having an output connection upon which a read-out signal appears upon the transition of said core from its second state to its first state, a read-out storage device settable from a first to a second state in response to said read-out signal, a write signal generator for generating a write signal each time a reset signal is applied to said core, a current conducting connection connecting said signal generator to said core to apply the write current signal, and switching means in said connection to connect and disconnect the signal from said generator from said core when said read-out storage device is switched between its states to enable or disenable said connection when said read-out storage device is in a respective one of its states, erase means for generating an erase signal for resetting said read-out storage device to its first state, and means including said signal generator and erase means for generating said erase, reset and write signals in sequence.

References Cited by the Examiner

UNITED STATES PATENTS

| | | | |
|---|---|---|---|
| 2,776,419 | 1/1957 | Rajchman et al. | 340—174 |
| 2,840,801 | 6/1958 | Beter et al. | 340—174 |
| 2,922,145 | 1/1960 | Bobeck | 340—174 |
| 2,963,686 | 12/1960 | Spencer | 340—174 |

ROBERT C. BAILEY, *Primary Examiner.*

JOHN F. BURNS, MALCOLM A. MORRISON, *Examiners.*